Feb. 9, 1971   B. GULISTAN   3,561,093
METHOD OF ATTACHING A SLEEVE TO A WORKPIECE
Filed Nov. 29, 1968   7 Sheets-Sheet 1
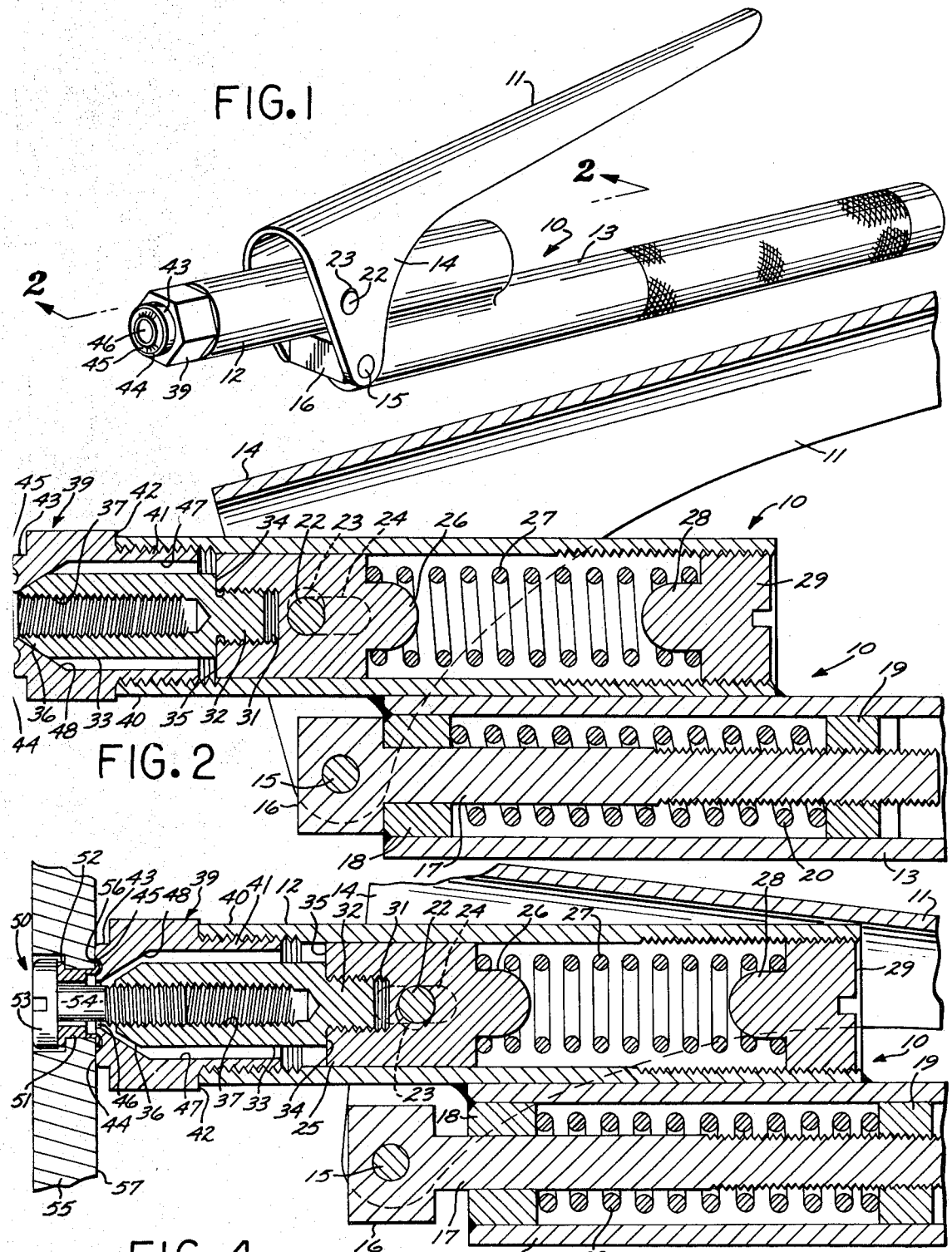
INVENTOR.
BULENT GULISTAN
BY
*Jacobwitz & Carr*
ATTORNEYS.

Feb. 9, 1971       B. GULISTAN       3,561,093
METHOD OF ATTACHING A SLEEVE TO A WORKPIECE
Filed Nov. 29, 1968       7 Sheets-Sheet 2
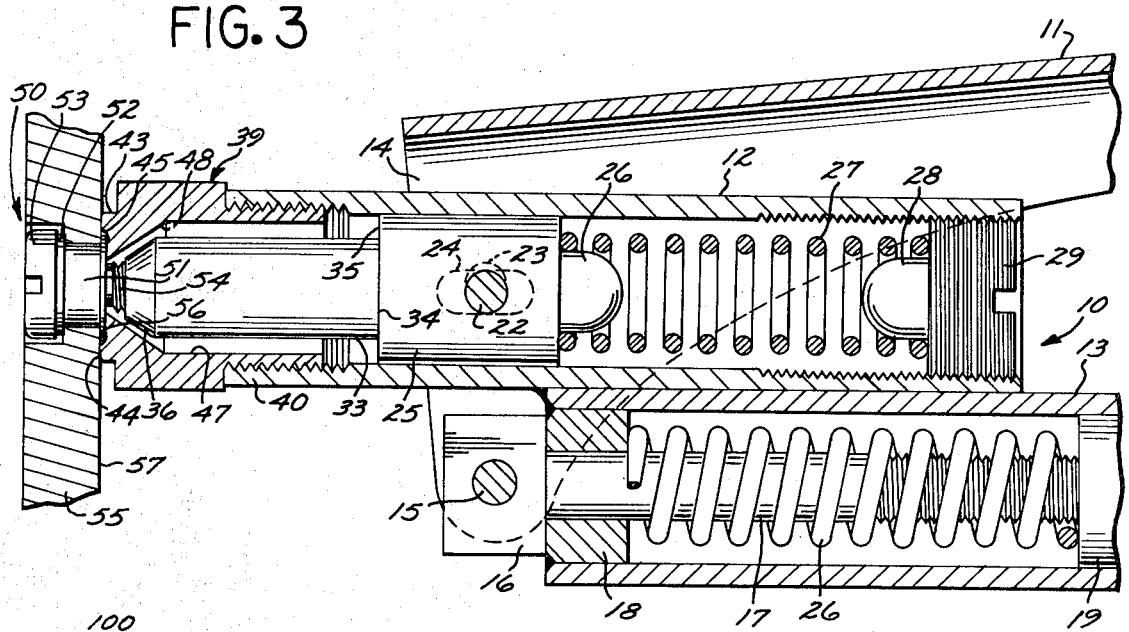
FIG. 3
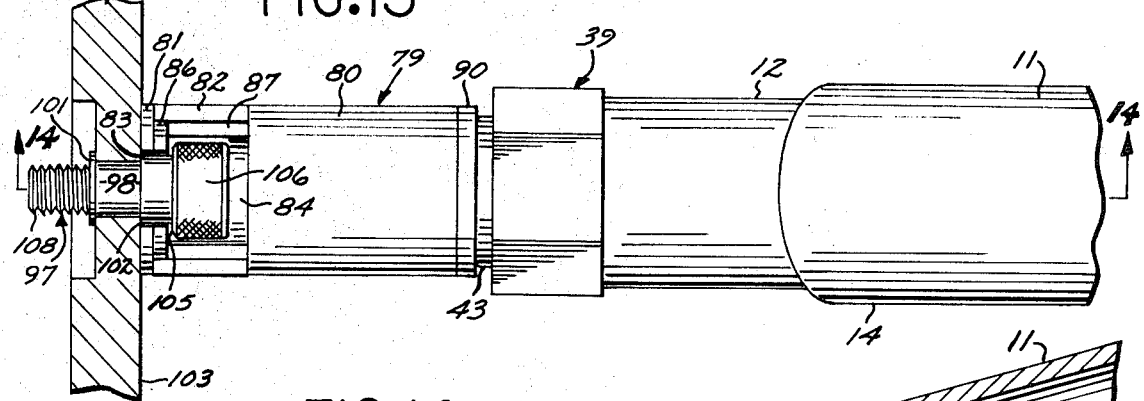
FIG. 13
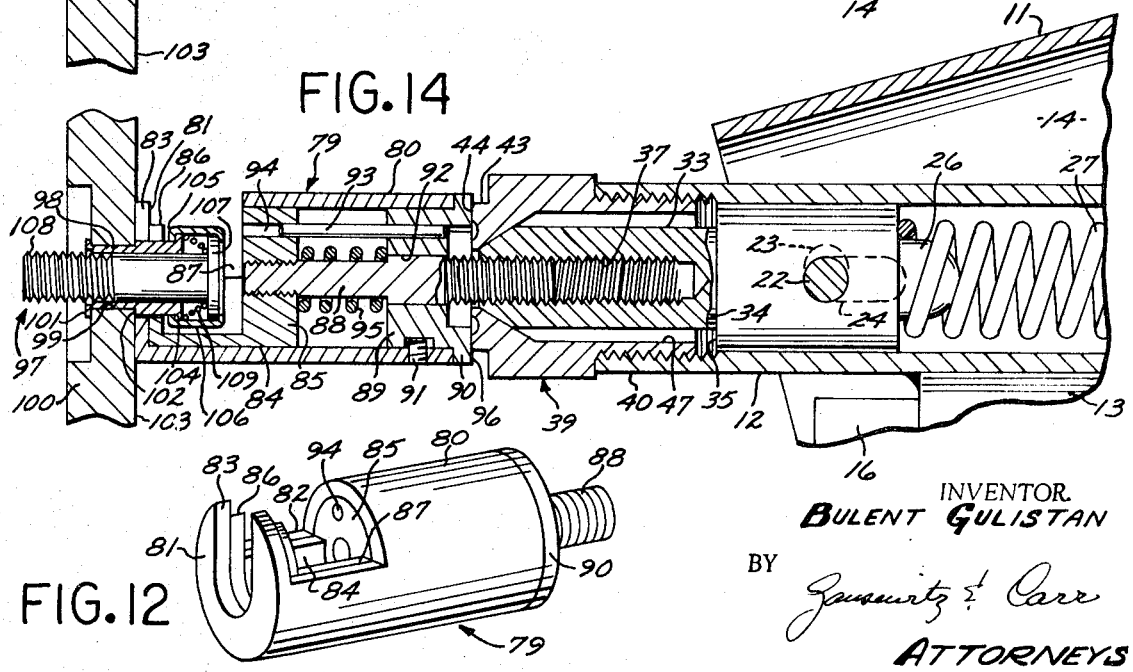
FIG. 14
FIG. 12
INVENTOR.
BULENT GULISTAN
BY
ATTORNEYS

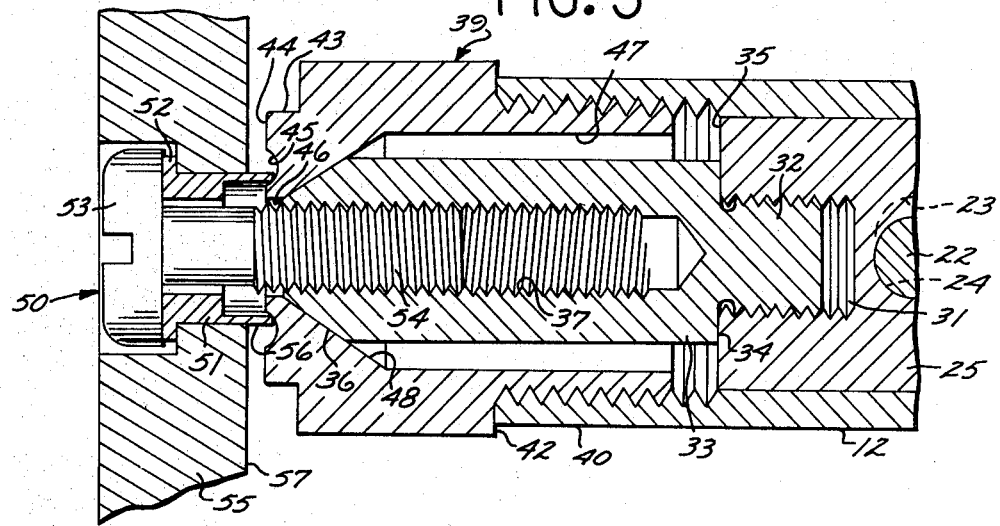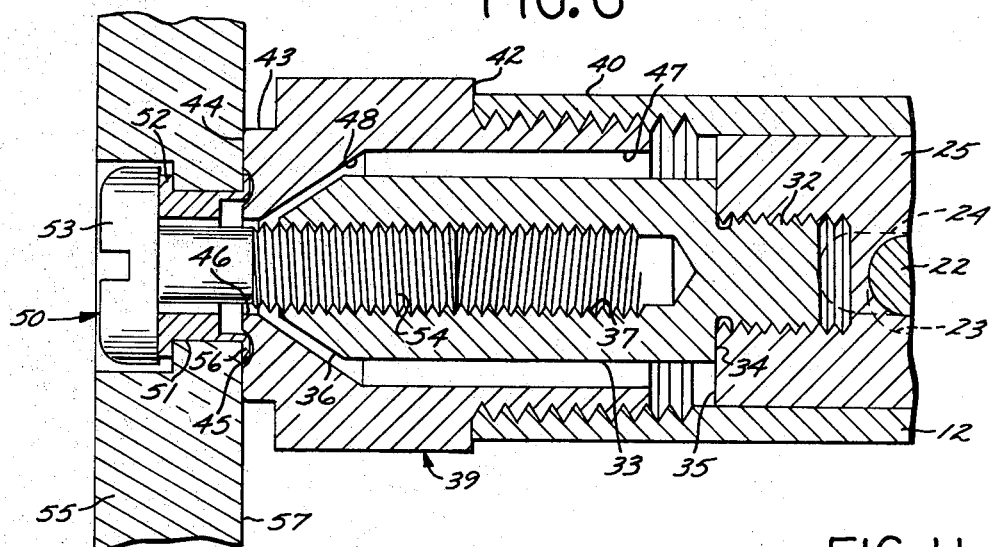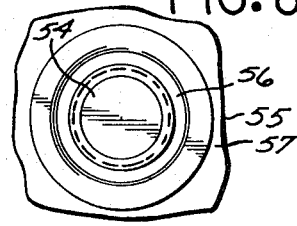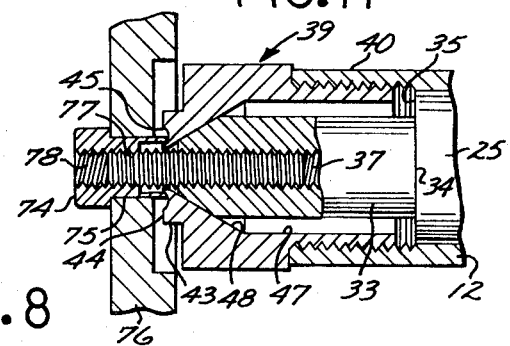

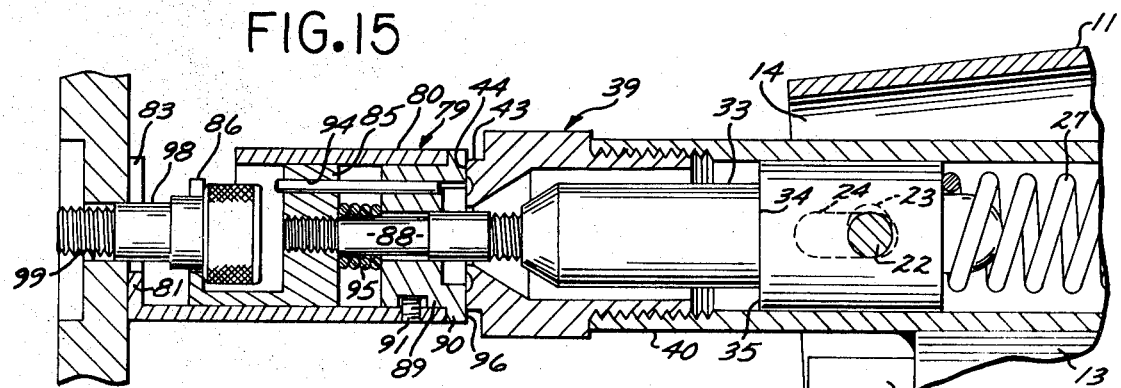
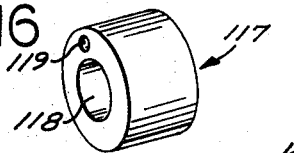
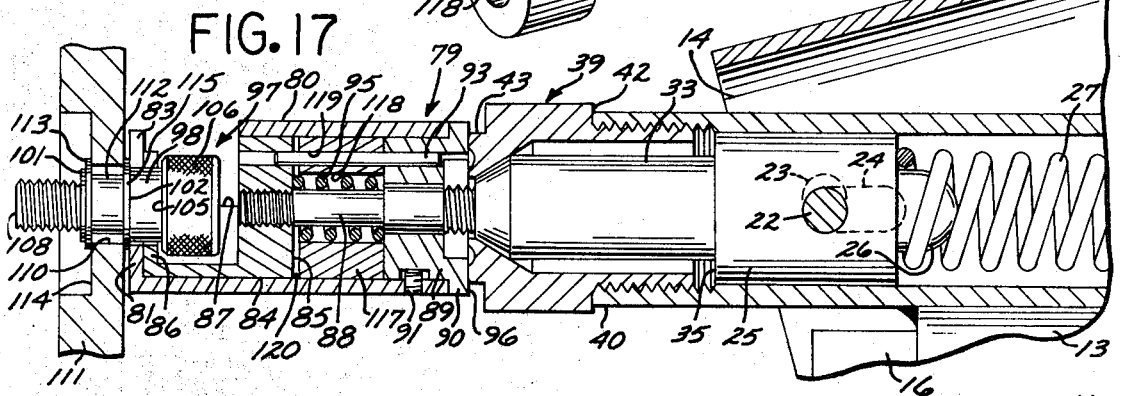
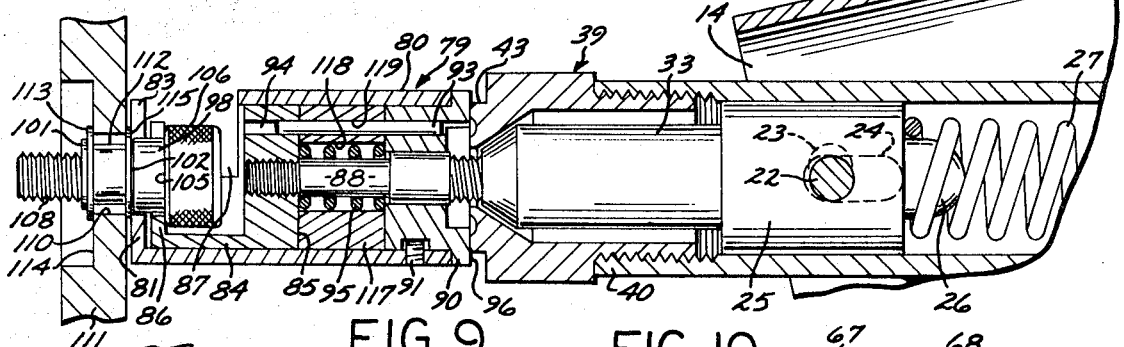
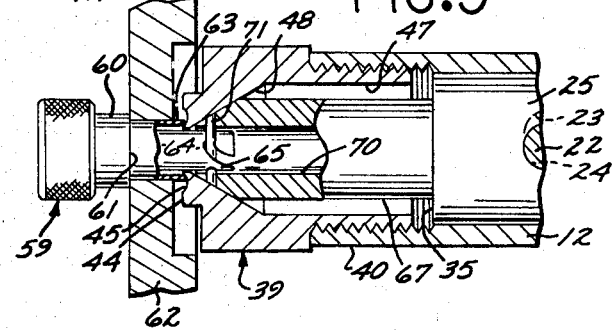
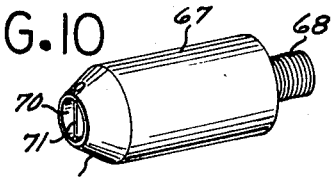
INVENTOR.
BULENT GULISTAN
BY
ATTORNEYS Feb. 9, 1971    B. GULISTAN    3,561,093
METHOD OF ATTACHING A SLEEVE TO A WORKPIECE
Filed Nov. 29, 1968    7 Sheets-Sheet 5

INVENTOR.
BULENT GULISTAN
BY
ATTORNEYS

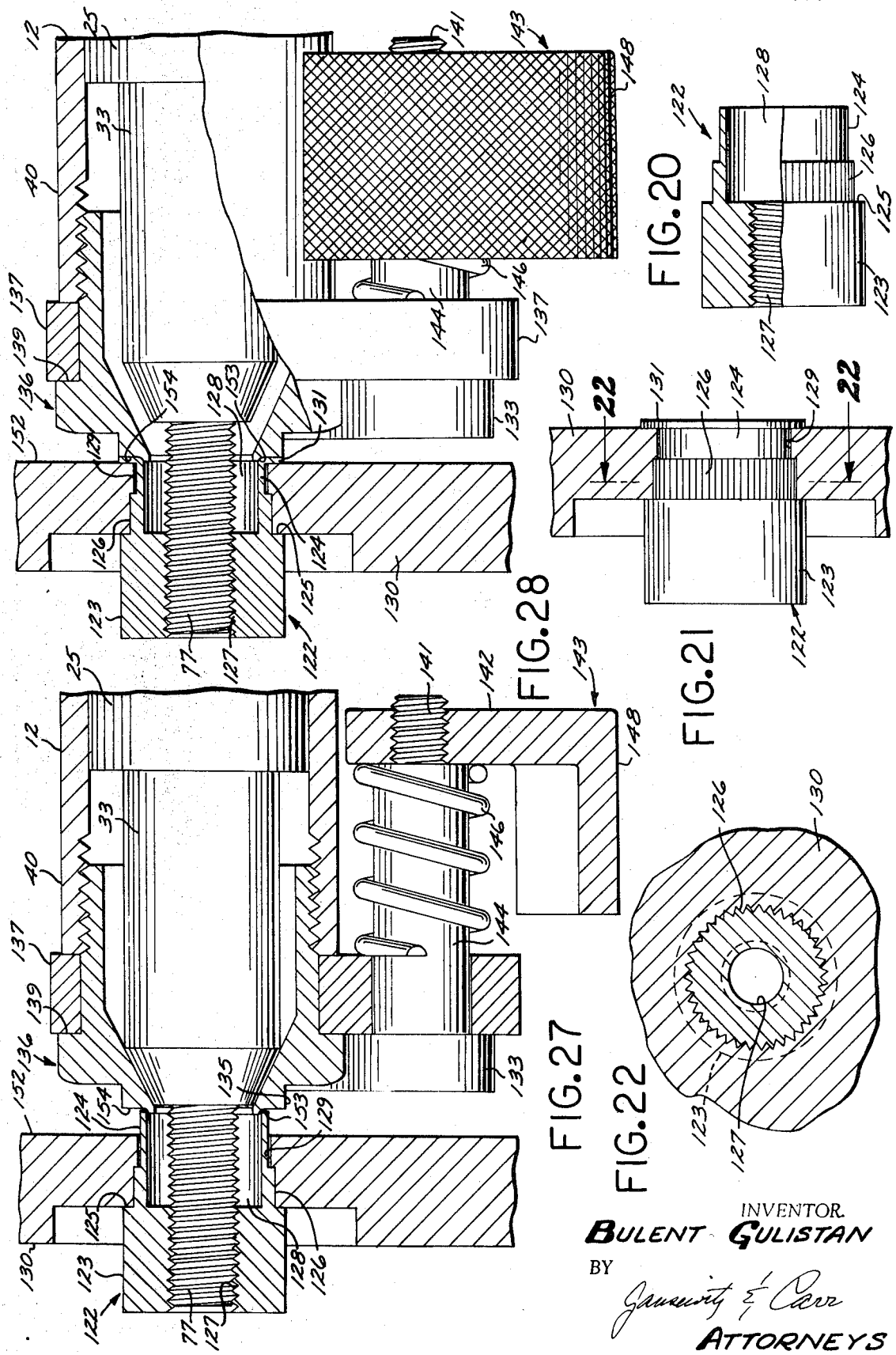

Feb. 9, 1971   B. GULISTAN   3,561,093
METHOD OF ATTACHING A SLEEVE TO A WORKPIECE
Filed Nov. 29, 1968   7 Sheets-Sheet 7
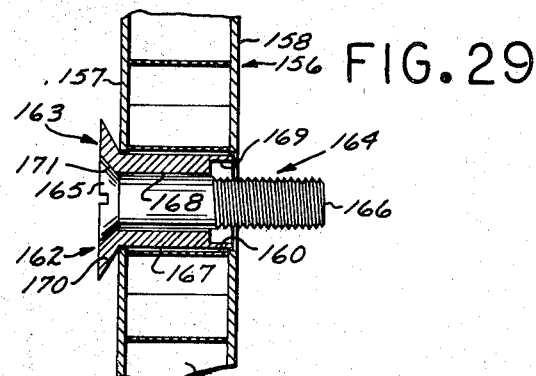
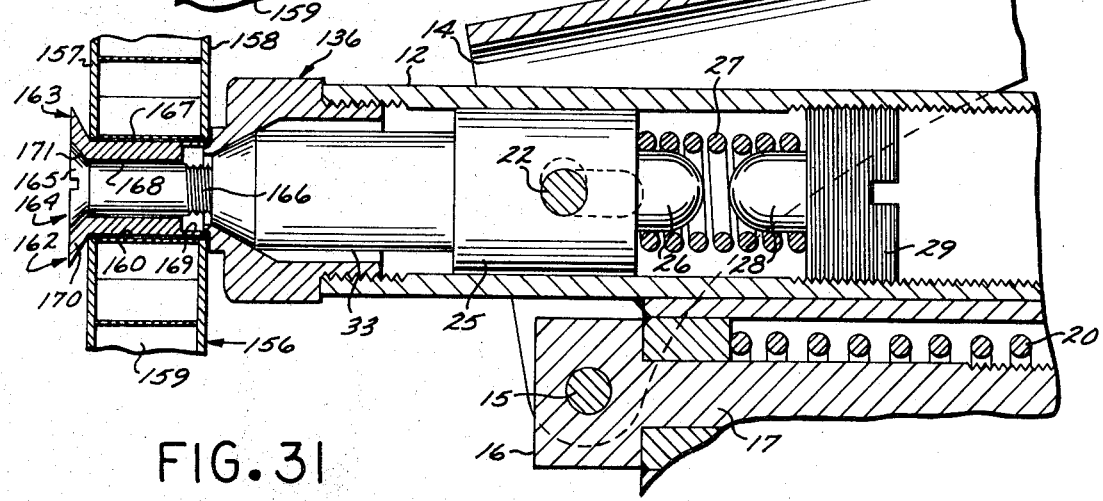
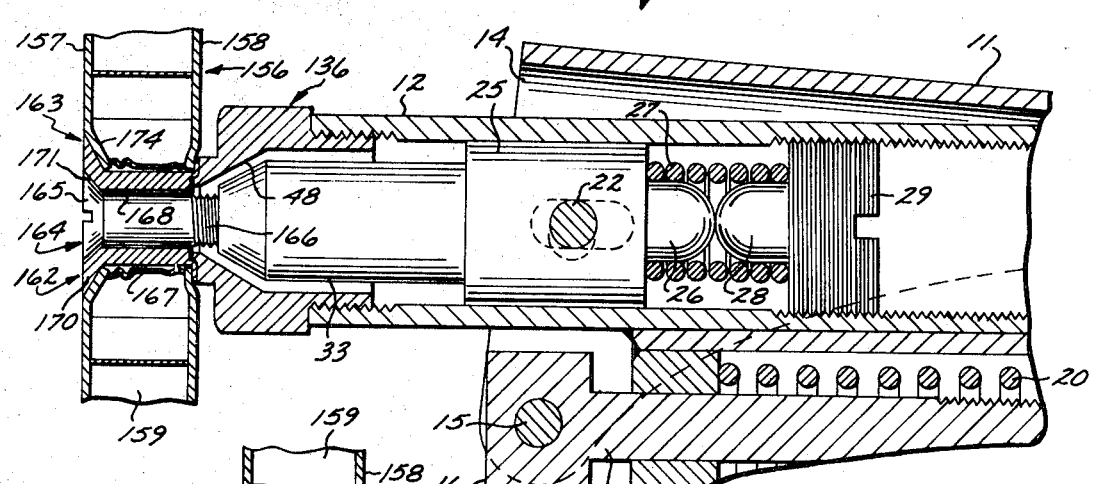
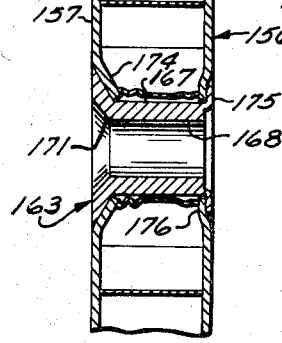
INVENTOR.
BULENT GULISTAN
BY
ATTORNEYS

United States Patent Office 3,561,093
Patented Feb. 9, 1971

3,561,093
METHOD OF ATTACHING A SLEEVE TO A WORKPIECE
Bulent Gulistan, Malibu, Calif., assignor to Deutsch Fastener Corp., Los Angeles, Calif., a corporation of California
Continuation-in-part of application Ser. No. 744,260, June 13, 1968, which is a continuation-in-part of application Ser. No. 578,728, Sept. 12, 1966. This application Nov. 29, 1968, Ser. No. 784,527
Int. Cl. B23p 17/00; B21d 39/00; B23b 11/00
U.S. Cl. 29—400                                                14 Claims

ABSTRACT OF THE DISCLOSURE

The method of securing a sleeve to a workpiece in which the sleeve is provided with a first abutment at one end and is inserted into an opening in the workpiece so as to bring the first abutment into adjacency with a surface of the workpiece. A gripping member having a second abutment and a shank is extended through the sleeve so that the second abutment engages the sleeve and the shank projects beyond the opposite sleeve end, a tension then being applied to the shank to hold the first abutment firmly against the workpiece surface, while simultaneously the opposite end of the sleeve is bent outwardly to form an overlapping flange cooperating with the first abutment to secure the sleeve to the workpiece.

---

This application is a continuation-in-part of my co-pending patent application Ser. No. 744,260, filed June 13, 1968, for Flaring Tool, now abandoned, which is a continuation-in-part of my patent application Ser. No. 578,728 filed Sept. 12, 1966, for Flaring Tool, now abandoned.

This invention pertains to a method for providing a flanged end on a tubular member and for removing such a member from a workpiece.

The tool and method of this invention can be used to advantage with fasteners which include tubular elements which are used in securing the fastener to the workpiece. Typically, this may be a captive screw in which the tubular element retains the fastener to the workpiece, and through which extends a stud for engaging a mating fastener component. It is necessary in installing such fasteners to bend the end portion of the tubular member outwardly over the surface of the workpiece to form the attachment to it. Previously, this usually has been done by manually tapping a tool against the end of the tubular member. This is a laborious process, difficult to achieve in cramped quarters and one which provides inconsistent results. Moreover, in the past there has been no ready means for removing the fastener from the workpiece once the flange has been formed.

The device of the present invention both installs and removes such tubular elements rapidly and easily. The tool includes a housing to which a handle is pivoted, and within which is a slidable element adapted to engage one portion of the fastener to be secured. The handle, through a cross pin, connects to the slidable member. The end of the housing has a die surface which engages the end of the tubular member, so that, when the handle is rotated, the slidable member moves relative to the housing and the die surface forms the flange. Preferably, the member to which the handle is pivotally connected is spring-loaded, so that the pivot point will shift after the handle has imparted a predetermined force on the fastener being secured. This avoids overstressing any of the parts from squeezing the handle too tightly. For removal of the tubular element of the fastener, an adapter is attached to the end of the tool, allowing the fastener to be pulled axially so that the flange is bent back to a cylindrical form and the fastener is separated from the workpiece easily.

In securing a tubular element to a workpiece, it is provided with a head at one end and extended through an opening in the workpiece so that its opposite end projects beyond the surface of the workpiece past the opening. A stud is extended through the tubular element and a tension force exerted on the shank of the stud, holding the head of the tubular element against one side of the workpiece. With this force applied, the opposite end of the tubular element is bent outwardly to provide the flange. When the workpiece is of compressible material, such as a honeycomb panel, the tubular element may be made flush with the workpiece simultaneously with the formation of the flange. This is done by exerting a force on the tubular element of sufficient magnitude to deflect the workpiece inwardly and allow the head of the tubular element to become buried in the recess thus formed, resulting in a flush surface. Also, the flange formed at the opposite end may be pushed inwardly so that it, too, is recessed and the installation is flush at both ends.

The tool also can be used in a two-step operation by which it initially forces a part into an opening in the workpiece and then bends the flange outwardly. Such a part may be a nut having a straight knurl on its periphery which becomes embedded in the workpiece around the opening to prevent the nut from rotating. The knurled portion must be forced into the opening in order for it to cut into the workpiece. In installing the nut, a spacer is provided to hold the die away from the workpiece as the knurled section is pulled into the opening, after which the spacer is removed and the flange is bent. Without the spacer, the tool will tend to bend the flange while it forces the knurled part into the opening, resulting in a loose connection of the part to the workpiece.

The knurled nut is advantageous, being held against rotation by the knurl, while securely retained against axial forces by the flange. Prior nuts of this general type did not have a retaining flange. Instead, they used a short knurled portion spaced from a shoulder. The material of the workpiece was intended to flow in behind the knurl, entering the space between the knurl and the shoulder to provide a barrier for holding the nut against axial forces. However, the resistance of this barrier is easily overcome, and such nuts frequently become dislodged by relatively small axial forces. Also, by relying on the flow of the workpiece material, the nut cannot be secured to a workpiece of a material, such as plastic, that will not flow. Furthermore, with the knurl being spaced from the shoulder, the workpiece must have a thickness such that the knurl remains embedded in the periphery of the opening after the nut has been pushed into place. For a thinner workpiece, the knurl will pass entirely through the opening, no longer engaging the workpiece to prevent rotation. Thus, this prior arrangement cannot be used for relatively thin panels.

The nut of the present invention provides a positie retention between a shoulder and the end flange, so that there is virtually no danger of its becoming separated from the workpiece during use. The knurl extends all the way to the shoulder, which assures that the knurl will engage the workpiece, even when the workpiece is very thin. This holds true regardless of the characteristics of the workpiece, as the attachment is effected entirely by the fastener. The nut will be held securely to plastics or parts of other material that will not flow.

An object of this invention is to provide an arrangement for easily and securely attaching a sleeve member to a workpiece.

Another object of this invention is to provide a method for securing a fastener to a workpiece where the fastener includes a sleeve and a member extending through the sleeve.

A further object of this invention is to provide a method for securing a sleeve to a workpiece of honeycomb sandwich construction so as to provide a flush installation at either end of the sleeve.

These and other objects will become apparent from the following detailed description taken in connection with the accompanying drawing in which:

FIG. 1 is a perspective view of the tool of this invention;

FIG. 2 is an enlarged longitudinal sectional view of the tool;

FIG. 3 is a view similar to FIG. 2 with the tool attached to a fastener and the handle rotated during the formation of a flange on the fastener;

FIG. 4 is a view similar to FIG. 3 but with the handle rotated further, illustrating the overtravel provision that limits the force that can be applied;

FIG. 5 is an enlarged fragmentary illustration of the forward portion of the tool as initially associated with the fastener;

FIG. 6 is a view similar to FIG. 5 with the formation of the flange complete;

FIG. 7 is a longitudinal sectional view of the fastener after being secured to the workpiece by the tool;

FIG. 8 is an end elevational view of the arrangement of FIG. 7;

FIG. 9 is a fragmentary sectional view of the tool modified to secure a fastener having a slotted rather than threaded shank;

FIG. 10 is a perspective view of the slidable member used in attaching the fastener of FIG. 1;

FIG. 11 is a fragmentary sectional view of the tool as used in securing a nut to a workpiece;

FIG. 12 is a perspective view of the adapter used for removing a flanged fastener from a workpiece;

FIG. 13 is a top plan view using the adapter of FIG. 12 associated with a fastener to be separated from the workpiece;

FIG. 14 is a longitudinal sectional view taken along line 14—14 of FIG. 13;

FIG. 15 is a view similar to FIG. 14 after operation of the tool to loosen the fastener;

FIG. 16 is a perspective view of a spacer which can be used with the adapter for enabling the adapter to loosen a fastener which is to have a floating connection to a workpiece;

FIG. 17 is a longitudinal sectional view of the tool utilizing the spacer of FIG. 16 and associated with a fastener to be loosened;

FIG. 18 is a view similar to FIG. 17 after actuation of the tool to loosen the fastener;

FIG. 20 is an elevational view, partially broken away, illustrating a nut which is to be inserted into an opening into a workpiece and provided with an outwardly bent flange by the use of the tool;

FIG. 21 is an elevational view, partially in section, of the nut of FIG. 20 in the installed position;

FIG. 22 is a sectional view taken along line 22—22 of FIG. 21;

FIG. 27 is a sectional view illustrating the tool in a subsequent position for bending the flange;

FIG. 28 is a sectional view showing the device after bending the flange on the part;

FIG. 29 is a sectional view illustrating a sleeve associated with a panel of compressible material for attachment to it;

FIG. 30 is a sectional view illustrating the next step in which the tool is associated with the end of the shank of the member extending through the sleeve;

FIG. 31 is a sectional view of the assembly after actuation of the tool, with the flange having been bent outwardly on the end of the sleeve; and FIG. 32 is a sectional view illustrating the sleeve and panel after the attachment.

Figure 23:
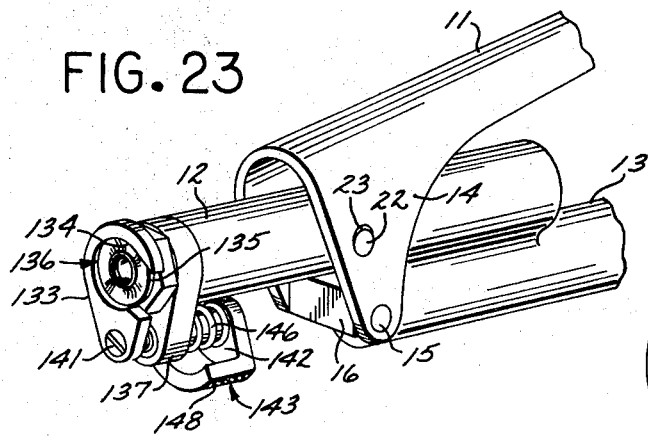
FIG. 23 is a fragmentary perspective view of the tool with an added spacer for use in installing parts having a knurled exterior.
Figure 24:
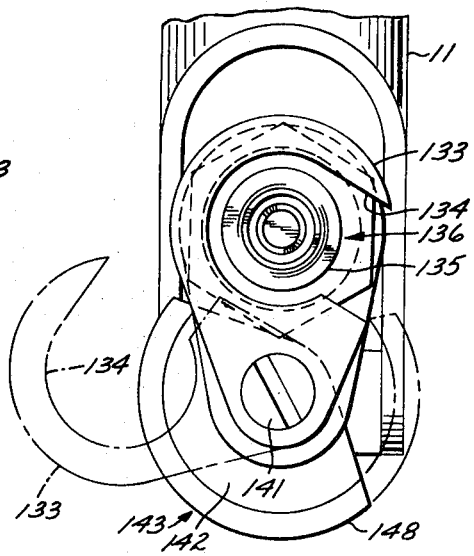
FIG. 24 is an enlarged end elevational view of the tool of FIG. 20.

With particular reference to FIGS. 1 and 2 of the drawing, the tool of this invention includes a housing 10 to which is attached a pivotal handle 11. The housing 10 includes an upper and a lower tubular member 12 and 13, which are secured together in a parallel relationship by brazing, welding or other suitable means. The handle 11 includes a U-shaped end portion 14, which extends around the upper tubular member 12 and, by means of a pin 15, is pivotally connected to a cross head 16 extending transversely at the forward end of the tube 13. A shaft 17 extends longitudinally into the tube 13 from the cross member 16, passing through a bushing 18 at the forward end of the tube 13. The opposite end of the shaft 17 is threaded and is received within a nut 19 that has a circular periphery, slidably received in the tube 13. A compression spring 20 extends around the shaft 17 between the bushing 18 and the nut 19.

Above the pin 15, the forward portion 14 of the handle 11 receives a second pin 22 that extends into vertically elongated opposed slots 23 in the handle. The pin 22 extends diametrically through the upper tube 12, passing through opposed slots 24 in the tube wall, which are elongated in the direction of the axis of the tube 12. The pin 22 also extends through a substantially complementary opening in a slide 25 within the upper tube 12. The slide is guided by the tube 12 so that it can move in a rectilinear path axially of the tube. One end of the slide 25 includes a dome-shaped protuberance 26 that fits within and centers a compression spring 27. A similar protuberance 28 is provided at the opposite end of the spring 27 on a nut 29 received in the threaded rearward end portion of the tube 12.

Opposite from the spring 27, the slide 25 includes an axial threaded opening 31 which receives the threaded stud portion 32 of a member 33 that projects forwardly from the slide. A radial shoulder 34 on the member 33 engages the radial end wall 35 of the slide 25. The opposite end of the member 33 includes an inwardly tapering frustoconical section 36 leading toward an axially inwardly extending threaded opening 37.

At the forward end of the upper tubular member 12 is the die member 39. The tubular member 12 includes an internally threaded portion 40 at its forward end, which receives the threaded rearward end 41 of the die member, while the radial shoulder 42 of the die member contacts the end edge surface of the tubular member 12. The periphery of the member 39 beyond the tube 12 may be hexagonal, as illustrated in FIG. 1, to facilitate tightening the die member in place.

On the forward face of the die member 39 is an annular projection 43 having an outer radial face 44 in which is formed an annular groove 45. An opening 46 in the end of the die member is inside and coaxial with the groove 45. This axis also is coincident with that of the tube 12 which defines the path of movement of the slide 25. Preferably, the recess 45 in cross section is defined by a section of a circle which is less than a semicircle. In a typical example, providing superior results in forming flanges for the tubular fastener parts, the surface of the groove 45 is defined by a radius of .046 inch and has a depth of .015 inch beneath the radial face 44.

Interiorly, the die member 39 includes a cylindrical bore 47, spaced outwardly of the member 33, connecting to an inwardly tapering frustoconical portion 48 adjacent the outer end of the member 39. The slope on the surface 48 is the same as that of the surface 36 of the member 33. The compression spring 27 reacting through the slide 25 normally maintains the surface 36 of the member 33 in engagement with the surface 48 of the die member 39.

In FIGS. 3–8, the use of the tool of this invention in forming a flange on the tubular element of a fastener is illustrated. The precise form of the fastener is not critical, but normally such a fastener will include a tubular member and a threaded stud as in the design shown. This fastener 50, therefore, is made up of a tubular collar 51 having a preformed flange 52 at one end adjacent the head 53 of the stud member from which extends a threaded shank 54. The sleeve 51 fits through an aperture in the workpiece 55 so that the shoulder defined by the flange 52 prevents axial movement of the sleeve to the right as the device is illustrated. When fully installed, the opposite end 56 of the sleeve, which projects beyond the surface 57 of the workpiece 55 when the sleeve is inserted, is bent over the surface 57 of the workpiece 55, as indicated in FIGS. 7 and 8. This forms a second flange, which cooperates with the flange 52 at the workpiece surface 57 in holding the sleeve 51 to the workpiece 55. To facilitate the outward bending of the flange, the bore through the sleeve 51 includes an internally enlarged portion 58 at the end 56.

In installing the sleeve 51, it is first fitted through the aperture in the workpiece 55, as indicated in FIG. 5. The projecting shank 54 of the stud then is threaded into the opening 37 in the member 33 of the tool. This brings the inner edge portion of the groove 45 of the die member into adjacency with the end corner of the sleeve 51 on the inner edge at the bore 58. Thus, the die groove 45 is inclined both radially and axially outwardly at the portion adjacent the end of the tubular element 51.

After this has been done, the handle 11 is pivoted about the pin 15. This is accomplished conveniently by gripping the lower tube 13 and the handle 11 with one hand and squeezing them together. As the handle 11 pivots about the pin 15, the second transverse pin 22 moves the slide 25 axially relative to the upper tube 12 of the tool. As the slide 25 is shifted within the tube 12, it pulls on the member 33 that is attached to it. This also exerts a tension on the shank 54 of the fastener 50, because the shank is threadably engaged with the member 33. The stud cannot move axially, however, because the head 53 engages the flange 52 adjacent the surface 57 of the workpiece 55, preventing such travel to the right as the device is shown. Therefore, the force from the handle is transmitted to the housing 10 through the cross member 16, its shaft 17, the nut 19 and the compression spring 20. This produces a reaction on the housing 10, which moves the die member 39 to the left as the device is shown against the end 56 of the sleeve 51. The die exerts a force, therefore, which bends the end portion 56 of the sleeve 51 outwardly along the inclined surface of the die groove 45. As the bending progresses, the radially outward portions of the groove are engaged by the tube end. This directs the tube end back toward the surface 57 of the workpiece 55. As a result, the end 56 of the collar 51 is bent into an outwardly extending flange that is tightly forced against the surface 57 of the workpiece, as shown in FIGS. 3 and 6. Thus, by a simple squeezing of the handle, the flange is formed and the fastener 50 is secured to the workpiece 55.

During use of the tool, some persons may tend to exert an excessive force on the handle 11. This could be so great that, in the absence of a safety provision, damage could result to the fastener 50, the workpiece 55 or the tool. The tool of this invention automatically prevents any overstressing of the parts in this manner, limiting the amount of force that can be applied, regardless of how hard the handle is compressed.

When the handle has been moved partway in its rotational travel about the pin 15, the flange will be fully formed, as illustrated in FIGS. 3 and 6. However, it may not be apparent to the operator of the tool that this has occurred, and the application of force may be continued. When the radial face 44 of the die member 39 bottoms against the wall of the workpiece 55 as the flange is formed, there will be an added resistance to the movement of the handle 11 relative to the housing 10. Therefore, a higher force is imposed upon the compression spring 20 that transmits the force from the handle to the housing. The spring 20 is calibrated such that at a predetermined force value, within safe limits, it will begin to compress and allow the member 17 to shift axially to the left as the device is shown. This effect may be seen in FIG. 4. Consequently, the continued rotation of the handle merely compresses the spring 20, but does not impose a significantly greater force on the tool or the workpiece. Ultimately, the travel of the handle is halted as it is fully pivoted to engage the lower tubular member 13.

In essence, therefore, the handle rotates relative to the housing first about the pin 15 as the flange is formed on the tube 51. Then, when the resistance becomes greater as the die bottoms against the workpiece, the handle pivots about the pin 22 as the bottom pin is shifted in position and no longer serves as the fulcrum. The vertically elongated slots 23 in the handle and the longitudinally elongated slots 24 in the upper tube 12 allow the parts associated with the housing 10 to move linearly as the rotational motion of the handle takes place. Thus, through the use of the tool of this invention, a correct installation is assured without damage to any component involved through the automatic limiting of the amount of force that can be applied by the tool.

Adjustability of the limiting force is provided through the nut 19, which can be positioned within the tube 13 to vary the compression of the spring 20. When the handle 11 is released, the spring 27 returns it to its original position where the movement is stopped by engagement of the surfaces 36 and 48 of the member 33 and the die 39, respectively. Rotation of the nut 29 controls the force of the spring 27.

For fasteners of different sizes, the same basic tool is used, while the members 39 and 33 may be replaced as required. This allows the die to be selected so that it will present a groove that will form a flange on fastener sleeves of different diameters. Also, the slidable member 33 can provide an opening to fit threaded shanks of various diameters.

The tool of this invention is readily adapted for attaching different kinds of fasteners, such as the type shown in FIGS. 9 and 10. Here, the fastener 59 includes a tubular sleeve 60 having a shoulder 61 on one side of the workpiece 62, and an end section 63 on the opposite side of the workpiece to be flared outwardly to form an attaching flange. The stud portion of this fastener has a straight unthreaded shank 64, at the end of which is an axial opening and a pair of arcuate slots 65 that terminate in locking recesses. This type of fastener is operated by a quarter turn of the stud to form a quick attaching device as the slots 65 are engaged with a transverse pin in an associated receptacle. A fastener utilizing a stud of this type may be seen in Pats. 1,955,740 and 2,564,101.

For attaching the fastener 59, the member 33 of the tool is removed and replaced by a member 67, which in most respects is identical to the member 33. The member 67 includes a similar threaded stud portion 68 that extends into the opening 31 and the slide 25, while the frustoconical forward portion 69 is adapted to bear against the complementary frustoconical surface 48 of the die member 39. Instead of a threaded opening, however, there is a straight bore 70 in the member 67, at the forward end portion of which is a transverse pin 71.

The tool, with the member 67 installed, engages the fastener 59 simply by rotating the tool or the stud so that the pin 71 enters the arcuate slots 65. This locks the member 67 to the shank 64, so that, upon movement of the handle 11, the die is forced inwardly to bend the flange at the end portion of the sleeve element 60. Again, therefore, there is an attachment between the stud part of the fastener and the slide element, while the body portion of the device forces the die inwardly to bend the flange and secure the fastener to the part.

In some instances, it may be desired to secure only a sleeve in an opening, rather than a fastener as seen in FIGS. 4 through 10. This may be, for example, to provide a bushing to protect a part at an opening where a member is to extend through the opening in the part during its use. Parts made of laminated glass fibers or various other materials may be protected in this manner, as the sleeve in the opening will prevent damage to the part from a bolt or other element extended through the opening as the part is in service.

Figure 19:
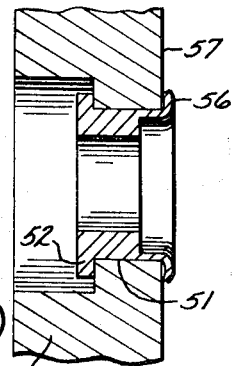
FIG. 19 is a sectional view of a sleeve secured to a workpiece in accordance with this invention.

The attachment of such a sleeve is accomplished essentially as described above for the fastener assemblies. A sleeve, such as the sleeve 51 of FIGS. 5 through 7, is extended through the opening in the workpiece, and an additional member is introduced into the sleeve. This member will have a gripping portion, which may be threaded as the shank 54, or have slots or other gripping means, such as the slots 65 of the device of FIG. 9. The gripping portion of the member then is engaged by the tool and the flange is bent as before. After this, the member is removed from the sleeve, leaving the latter element in the opening in the part to serve its protective function. The sleeve 51, with the stud removed following the formation of the flange 56, as shown in FIG. 19, will serve as a protective bushing in this manner for the part 55.

The tool of this invention will operate equally satisfactorily where the fastener or other device has no projecting stud portion as in the previously described embodiments. For example, as shown in FIG. 11, the fastener comprises a nut 74 having a tubular section 75 extending through and beyond the workpiece 76. The projecting part of the section 75 is to be bent outwardly to form the flange securing the nut 74 to the workpiece. For this type of installation, the tool embodiment of FIGS. 1–6 may be used without modification except for the addition of a threaded stud 77, one end of which is received in the threaded opening 37 of the member 33. The other end of the stud 77 enters the threaded opening 78 in the nut 74 as the tool is associated with the part. This brings the die surface 45 adjacent the end of the section 75 and, when the handle is squeezed, the flange is formed in the usual way. Here, therefore, the stud for the fixed element during the operation of the tool is furnished as a portion of the tool, rather than being a part of the workpiece.

For removing a fastener from the workpiece, the adapter 79 illustrated in FIGS. 12–15 is associated with the forward end of the tool. This adapter includes an outer sleeve 80 which is cut away on one side near its end wall 81. This provides an opening 82 in the circumferential wall of the sleeve 80. The end wall 81 has a laterally extending recess 83, giving the end wall a bifurcated configuration. Within the outer sleeve 80 is a shorter inner sleeve 84 having a relatively thick disc-like end wall 85 beyond the opening 82. The other end wall 86 of the member 84 is laterally recessed so that it is bifurcated and similar to the wall 81 of the outer sleeve. Intermediate the ends 85 and 86, the sleeve 84 is cut away on one side to provide an opening 87 registering with the opening 82 in the outer sleeve 80. A stud 88 has one end threaded into the central portion of the end wall 85 of the sleeve 84, while the opposite end of the stud extends into the threaded opening 37 of the member 33. This attaches the sleeve 84 to the member 33, so that, when the handle is moved, the member 84 will travel with the slide 25.

A disc 89 extends into the end of the outer sleeve 80, being positioned by its flange 90 and a set screw 91 that engages a recessed portion in the wall of the disc. An opening 92 in the center of the disc 89 slidably receives the stud 88. In addition, the disc 89 has an offcenter opening that receives a dowel pin 93, which projects from the member 89 to enter an opening 94 in the end wall 85 of the sleeve 84. The pin 93 in the opening 94 maintains the sleeve 84 rotationally aligned relative to the outer sleeve, so that openings 82 and 87, as well as the end walls 81 and 86, are in registry. A spring 95 is positioned between the disc 89 and the sleeve 84 and maintains the bifurcated end walls 81 and 86 normally in engagement. When the adapter 79 is attached to the tool, the outer wall 96 of the end disc 89 is brought into engagement with the radial face 44 of the die member 39.

As shown in FIGS. 13, 14 and 15, the adapter is being used to remove a fastener 97 of the type illustrated in Pat. 3,346,032, issued Oct. 10, 1967, for Captive Screw. This type of fastener includes an inner sleeve 98 extending through an opening 99 in the workpiece 100 and bent over at its outer end to provide a flange 101. This cooperates with a shoulder 102 at the opposite surface 103 of the workpiece in securing the sleeve 98 to the workpiece. The flange 101 may be formed by the tool of this invention in the manner described above. The member 98 includes an outwardly extending shoulder 104 spaced axially from the surface 103 of the workpiece 100, which is engaged by an inwardly extending shoulder 105 on an outer sleeve 106. The latter member is connected to a head 107 from which a stud 108 extends. A compression spring 109 normally keeps the fastener retracted, as shown, but can be compressed as the fastener is advanced when the stud 108 is threaded into an adjoining workpiece.

In removing the fastener 97 from the workpiece 100, the end wall 81 is placed adjacent the surface 103 of the workpiece and the adapter is moved laterally so that the sleeve 98 extends through the openings in the bifurcated end walls of the sleeves 80 and 84. This brings the outer sleeve 106 of the fastener 97 through the open side wall of the sleeves 80 and 84 so that it is positioned approximately at the axial center. At this time, the handle 11 of the tool is rotated relative to the bottom tube 13 so that the slide 25 shifts relative to the housing 10. As this occurs, the housing 10 remains axially fixed because of the engagement between the surface 44 of the die member 39 and the end flange 90 of the disc 89. The latter member, in turn, is secured in the outer sleeve 80 of the adapter 79, the end wall 81 of which bears against the surface 103 of the workpiece so that the housing 10 of the tool cannot move. Therefore, as the handle 11 rotates relative to the housing 10, the slide 25 draws the member 33 inwardly and with it the inner sleeve 84 of the adapter. This brings the end wall 86 of the inner sleeve 84 into engagement with the shoulder 105 of the outer sleeve 106 of the fastener, which through the shoulder 104 of the sleeve 98, exerts an axial force on the latter member. This force simply straightens the flange 101, pulling the flange portion into the opening 99 through the workpiece. The flange 101 is bent back to cylindrical shape as it is drawn through the opening 99 so that it no longer secures the fastener to the workpiece. This action of the tool in removing the fastener is illustrated in FIG. 15. Thus, the fastener can be removed as easily as it is installed, being loosened in the workpiece by one stroke of the handle 11 of the tool.

In some instances, the fastener 97 is attached to the workpiece so as to provide for floating movement. As shown in FIG. 17, the opening 110 in the workpiece 111 is oversize, being larger in diameter than the section 112 of the sleeve member 98 that extends through the workpiece. The flange 101 is bent over a washer 113, which is larger than the diameter of the opening 110, and overlaps the surface 114 of the workpiece 111. A similar washer 115 is provided on the opposite side 116 of the workpiece. Therefore, the flange 101 and the shoulder 102 secure the fastener 97 to the washers 113 and 115 which connect it to the workpiece 111. The diameter of the opening 110 being larger than the portion of the fastener extending through it means that the fastener is capable of lateral movement relative to the workpiece 111.

In order for this lateral movement to be permitted, however, there must not be too much compressive force on the washers 113 and 115. If the washers are squeezed tightly against the surfaces of the workpiece, the friction will resist lateral movement of the fastener so that the floating action will not be sufficiently free or cannot take place. As a result, for such installations, it is necessary to assure a certain amount of looseness at the connection to the workpiece 111. This, too, is accomplished by the device of this invention utilizing the adapter described above.

The adapter is attached to the forward end of the tool, modified, however, through the installation of a spacer disc 117. This spacer is annular in construction, so that it has a central aperture 118 that receives the compression spring 95 when the spacer 117 is installed within the outer sleeve 80. Intermediate the end disc 89 and the end wall 85 of the member 84, an opening 119 in the spacer parallel to the axis receives the alignment pin 93. The spacer 117 is slightly shorter than the distance between the end disc 89 and the wall 85 of the inner sleeve 84. Therefore, with the spacer 117 adjacent the end disc 89, there is a small gap 120 between the spacer and the wall 85.

In loosening the fastener 97 from the position of FIG. 17 to allow the lateral floating movement, the tool is associated with the fastener similarly to the manner in which it is engaged for removing the fastener. Thus, the end wall 81 of the outer sleeve 90 of the adapter is placed adjacent the washer 115, while the end wall 86 of the inner sleeve 84 is next to the shoulder 105 of the outer sleeve 106 of the fastener. The handle 11 then is rotated relative to the housing 10 of the tool to shift the end wall 86 relative to the end wall 81. This pulls outwardly on the sleeve member 98 of the fastener. However, the amount of movement is small and limited by the spacer 117. The sleeve 84 can move only until the small gap 120 between the spacer 117 and the end wall 85 is closed and the end wall 85 is brought into contact with the spacer 117. This position of the tool is illustrated in FIG. 18. Such limited movement, therefore, does not separate the fastener from the workpiece 111. Instead, it straightens a small section of the flange 101, but the flange still overlaps the washer 113 to hold the fastener to the washer, which, in turn, keeps the fastener on the workpiece. However, the compressive force between the washers 113 and 115 is relieved, so that now there is a loose connection and the fastener easily floats in a lateral direction as desired. Thus, the tool of this invention has still another capability with a very simple modification to its assembly.

In some instances, the tool of this invention may be used in forming a flange on a part which has a knurl or other projection on the periphery of the portion of it that is received in the opening in the workpiece. This may be, for example, a nut which should be held against rotation to avoid the requirement for the use of a wrench to prevent it from turning as the bolt engages it. In the design shown in FIG. 11, where the nut 74 has only a straight cylindrical portion 75 extending through the opening in the workpiece 76, it is not secured against rotation relative to the workpiece 76. With that design, it is necessary to employ a wrench to prevent the nut from rotating when a bolt is threaded into it. This not only is inconvenient, but may be impossible where the nut is positioned in an accessible location. The nut 122 shown in FIGS. 20, 21 and 22 does not have this shortcoming, being provided with an externally toothed portion which becomes embedded in the material of the workpiece around the opening, which locks the nut against rotation relative to the workpiece.

The nut 122 includes a portion 123 of cylindrical exterior, beyond which is a similarly contoured section 124 of smaller diameter. A radial shoulder 125 is provided between the sections 123 and 124. Projecting radially beyond the circumferential surface of the section 124 is a knurled section 126. This has a straight knurl extending longitudinally of the nut. This knurl may extend to the shoulder 125, which is important where the nut is to be attached to a thin panel, as discussed below.

Within its interior, the nut includes a threaded opening 127 through the portion 123, which connects to a larger unthreaded bore 128 in the section 124. This provides the end of the device with a relatively thin wall to permit it to be bent outwardly in producing a flange. Thus, as seen in FIG. 21, the device is extended through an opening 129 in a workpiece 130, while the outer end of the section 124 is bent over the workpiece to form a flange 131. This flange cooperates with the shoulder 125 in retaining the nut 122 to the workpiece 130 and preventing axial movement. Moreover, the teeth defined by the knurled section 126 become embedded in the workpiece around the opening 129 through it, thereby locking the nut 122 against rotation. Consequently, the nut 122 is held against any movement relative to the workpiece 130, and may be engaged by a bolt in completing an attachment for the workpiece 130. The bolt passes freely through the end bore 128, which is larger than the major diameter of the threaded opening 127.

With the knurl 126 extending all the way to the shoulder 125, the nut 122 may be associated with a thin panel and still be locked against rotation. Regardless of the thickness of the workpiece at the opening, the knurl will remain in engagement with the workpiece to hold against rotary movement. If the knurl were spaced from the shoulder, as in the designs of the prior art, it would pass all the way through a thin panel rather than staying embedded in the material. Also, such earlier designs relied upon the flow of the material of the workpiece in back of the knurl to provide an interfering surface to prevent the nut from being displaced axially, and, therefore, required the outward spacing of the knurl. This has not been satisfactory, even in thicker parts, resisting very little force and having nowhere near the strength of the flange 131 that holds the nut of this invention. These prior designs are completely inoperative for material that will not flow, such as plastic, while the present invention holds equally well in all materials.

The installation of the nut 122 poses a problem in that it is necessary to apply an axial force to it in moving the knurled section 126 into the opening 129 in the workpiece 130. This is required because the teeth of the knurl must cut into the workpiece to provide the means for locking against rotation. In utilizing the flaring tool as arranged in FIG. 11 with a knurled nut, the tool simultaneously will draw the nut into the opening into the workpiece and bend the end outwardly to form the attaching flange. This means that a tight connection will not be obtained and that there will be a looseness between the flange 131 at the end of the section 124 and the shoulder 125, as the nut will not tightly grip the workpiece. However, with the use of the attachment illustrated in FIGS. 23 through 26, the tool can install the nut 122 in a two-stage operation, first pulling it into the opening in the workpiece and then bending over the flange. This avoids premature bending of the flange and assures that the workpiece is gripped firmly between the flange and the shoulder 125.

At the forward end of the tool, as shown in FIGS. 23 through 26, is a spacer 133, which is a transverse flat plate that includes a slot 134 extending into one side of it. The slot 134 in the spacer 133 is circular in its inner contour and dimensioned to receive the circular periphery of the forward portion 135 of the die member 136. The spacer 133 is pivotally connected to a bracket 137, which is adjacent but inwardly of the forward end of the tool. The bracket 137 has an opening receiving the cylindrical portion 138 of the die member 136, so that it is held against the forward threaded end portion 40 of the tubular member 12 by the shoulder 139 of the die member. One end of a screw 141 extends perpendicularly through a spacer 133, while the opposite end is threaded into the end wall 142 of a knob 143. The screw 141 is received within a tube 144 which extends rotatably through an opening 145 in the bracket 137 and at its ends engages the spacer 133 and the wall 142 of the knob 143. This couples the spacer 133 to the knob 143 so that rotation of the latter member will pivot the spacer 133 relative to the bracket 137.

The spacer 133 is urged toward the bracket 137 by a compression spring 146, which is interposed between the bracket 137 and the wall 142 of the knob 143. Therefore, the bracket may be positioned as shown in FIGS. 23 through 26, where the forward portion of the die is received in the slot 134 and the spacer extends around the die, or it may be moved to a position remote from the die as seen in phantom in FIG. 24. In the former position, the spring 146 holds the spacer 133 against the surface 147 of the die member. When the spacer 133 is to be moved away from the die, it is swung free and moved axially of the tool by the spring 146 to where it engages the bracket 137 and is shifted inwardly of the forward end of the die. This movement is accomplished by rotating the knob 143, which is conveniently done by the thumb engaging the knurled outer wall 148 of the knob.

In installing the nut 122, the spacer 133 initially is positioned around the forward portion 135 of the die member 136. The nut 122 is positioned with its tubular end portion extending into the opening 129 in the workpiece 130, but with the knurled section 126 exteriorly of this opening. The stud 77, which extends forwardly from the member 33 that is connected to the slide 25, is threaded into the opening 127 of the nut 122. Then, the tool is operated in the usual manner by rotating the handle 11. This exerts an axially inward pull on the nut 122, forcing the knurled section 126 into the opening 129 and bringing the shoulder 125 into engagement with the surface 151 of the workpiece around the opening 129. As this movement of the nut 122 takes place, the end of the section 124 of the nut remains clear of the end of the die member 136. This is because the parts are proportioned so that the end of the die member is spaced away from the adjacent surface 152 of the workpiece 130 by the spacer plate 133. This spacing is such that the movement of the nut into the opening in the workpiece has no effect upon the bending of the flange.

Figure 26:
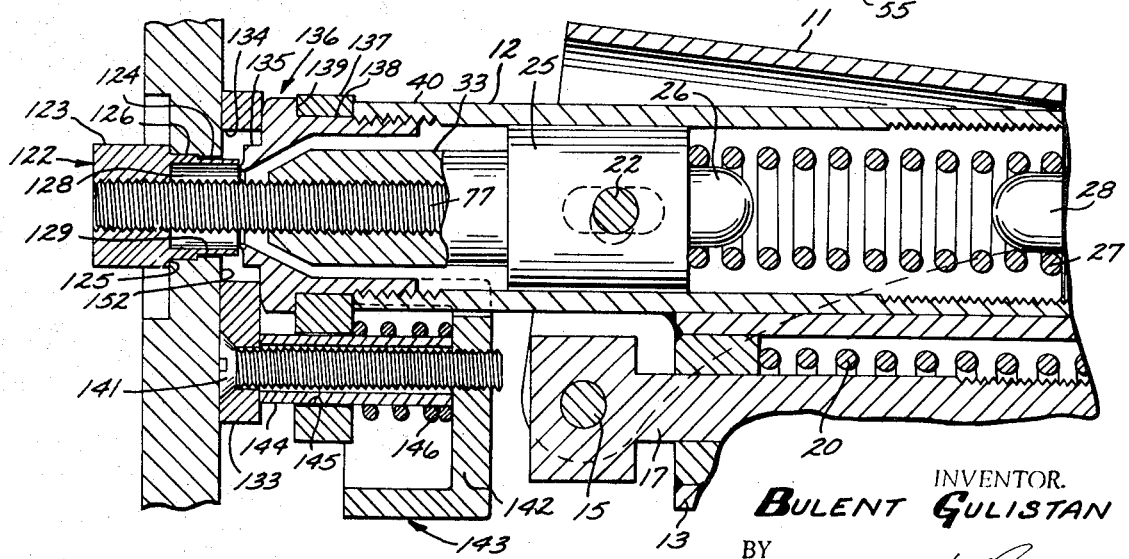
FIG. 26 is a sectional view taken along line 26—26 of FIG. 25, but with the tool shifted in position to draw the knurled section of the part into the opening in the workpiece.

After the nut has been shifted to the position of FIG. 26, the spacer is moved away from the die and the flange 131 is formed. This is accomplished by first rotating the tool relative to the stud 77 to loosen it sufficiently to allow the spacer 133 to be shifted outwardly past the die 136 and then rotated and moved in the opposite direction to its remote position. The tool then is rotated in the opposite direction to bring the die into adjacency with the end section 124 of the nut. With the spacer 133 out of the way, the end of the die then engages the tubular end portion of the nut 122 and forms the flange 131 on the next stroke of the handle 11. As a result, the workpiece 130 is held tightly between the shoulder 125 and the flange 131.

The forming groove of the die 136 is modified slightly from that of the groove 45 of the die 39 described above. The die face is recessed to provide a single outwardly facing arcuate surface 153, generated by a segment of a circle, outwardly of which is a radial surface 154. This groove configuration causes the flange 131 to be radial when it is formed, with its outer portions extending in the same directions as the flat surface 154 of the die. The annular groove 45, on the other hand, with its return bend at the outer portion of the groove, tends to provide the flange with a slight curl rather than causing all portions of the flange to lie flush against the surface of the workpiece.

The tool also may be used in securing a sleeve or a fastener to a part of honeycomb sandwich construction or of other compressible material. The honeycomb panel 156 shown in FIG. 29 is conventional, including outer panels 157 and 158 between which is a core 159 of honeycomb material. Normally, the outer panels 157 and 158 are of metal, while the core 159 may be of plastic, metal or other suitable material. In order to attach a sleeve in the honeycomb panel or to secure a fastener to it, there first is drilled an opening 160 that extends through the outer panels and the core 159.

Next, there is inserted into the opening 160 an assembly 162 made up of a sleeve 163 and a stud 164. The latter member has a flush head 165 and a shank 166 threaded at its outer end. The sleeve 163 is generally comparable to the tubular collar 51 described above, having a cylindrical exterior surface 167 and a cylindrical bore 168 through which the shank 166 of the stud 164 slidably fits. An enlarged bore 169 is at one end of the sleeve 163 for providing a thin-walled section which can be bent outwardly to form an attaching flange. At the opposite end of the sleeve 163 is a head 170 which is frustoconical to provide a flushhead configuration. A frustoconical recess 171 in the end of the sleeve is dimensioned to completely receive the head 165 of the stud 164.

The assembly 162 first is associated with the honeycomb panel 156 in the manner shown in FIG. 29. The sleeve 163 fits into the opening 160, but the head 170 is of larger diameter than the opening 160 and so cannot extend into it. With the assembly 162 positioned in this way, the stud 164 is associated with the tool by threading the end of the shank 166 into the opening 37 in the member 33, as shown in FIG. 30.

Then, upon actuating the handle 11, the member 33 is shifted axially to the right as the device is shown, pulling on the shank 166 of the stud 164. This, through the head 165 of the stud, bearing against the recess 171 in the head 170 of the sleeve 163, causes an axial force to be exerted on the sleeve 163. This forces the head 170 of the sleeve 163 axially inwardly against the panel 157 of the honeycomb assembly 156. This force is made sufficient to exceed the yield point of the core 159 and to deflect the panel 157. Therefore, the core 159 becomes crushed locally beneath the head 170, permitting the head 170 to move inwardly with respect to the honeycomb panel 156. As this movement of the head 170 takes place, the panel 157 is bent inwardly around the periphery of the opening 160, providing an inwardly inclined frustoconical portion 174, as shown in FIG. 31. The stud 64 is moved by the member 33 an amount sufficient to cause the sleeve head 170 to create a recess in the panel 157 of a depth such that the head is entirely received within it. In this way, the outer surface of the head 170 is made flush with the outer surface of the panel 157. Therefore, as the handle 11 is actuated, the force exerted on the sleeve 163 causes a dimple to be formed in the panel 156 to receive the head 170 of the sleeve.

At the same time, as the die 136 is forced axially inwardly against the sleeve end and the flange 175 is formed, the panel 156 becomes deflected inwardly on its opposite side. The flange 175 compresses and bends the core 159 and the panel 158, producing a more shallow recess 176 that receives the flange 175. As a result, the flange 175 is made flush with the plane of panel 158.

The assembly 162 may be left in this position upon separation of the tool from the threaded stud 164, with the stud 164 extending through the sleeve 163. Alternatively, the stud 164 may be removed from the sleeve 163, leaving the sleeve in the honeycomb unit 156 to act as a grommet or bearing, as shown in FIG. 32.

In order to bring the head 170 of the sleeve precisely into a flush relationship with the panel 157, the travel of the member 33 and hence that of the stud 164 should be limited. If no such provision is made, it is possible to move the stud 164 too far, causing the head 170 to be forced inwardly relative to the panel 157 to a position where the head 170 is recessed beneath the plane of the panel 157 so that it is no longer flush with the panel surface. It then would depend upon the skill of the operator to rotate the handle 11 only the exact amount needed to cause the head 170 to be brought inwardly to a flush position.

The travel of the member can be limited to correct this merely by rotating the nut 29 to bring it inwardly closer to the slide 25 that is attached to the member 33. This position is shown in FIG. 31. Then, when the handle 11 is actuated, the end 26 of the slide 25 will contact the protuberance 28 of the nut 29 after the slide has moved a predetermined distance. In this manner, the tool can be adjusted to cause the member 33 to move an appropriate amount, depending upon the dimensions of the parts involved. With the nut 29 used to provide a positive stop in this manner, the overload spring 20 and its associated mechanism may be eliminated, if desired.

I claim:

1. The method of attaching a sleeve and gripping member assembly to a workpiece comprising the steps of
   providing an outwardly extending abutment at one end of a sleeve,
   extending said sleeve through an opening in a workpiece so that said abutment overlaps the surface of said workpiece adjacent said opening at one end of said opening and the opposite end of said sleeve projects axially beyond the opposite end of said opening,
   associating with said sleeve a gripping member having a head and a shank such that said head is adjacent said one end of said sleeve and said shank thereof projects outwardly beyond said opposite end of said sleeve,
   a gripping said shank and applying a tension force thereto,
       thereby holding said head against said one end of said sleeve and holding said abutment against said surface of said workpiece,
   and simultaneously with the application of said tension force bending said opposite end of said sleeve outwardly to overlap the surface of said workpiece adjacent said opening at said opposite end of said opening so as to provide a second abutment cooperating with said first abutment to hold said sleeve to said workpiece with said shank therein.

2. The method of attaching a sleeve and gripping member assembly to a workpiece comprising the steps of
   providing a sleeve with an outwardly extending flange at one end,
   extending said sleeve through an opening in a workpiece so that said flange is in engagement with said workpiece on one side thereof adjacent said opening and the opposite end of said sleeve projects outwardly beyond the surface of said workpiece adjacent said opening on the opposite side thereof,
   preparing a gripping member with a head at one end and a shank extending outwardly from said head,
   extending said shank through said sleeve so that said head is adjacent one end of said sleeve and said shank extends outwardly beyond said opposite end of said sleeve,
   gripping said shank and applying a tension force thereto, thereby to hold said head against said sleeve adjacent said one end and to hold said flange in engagement with said workpiece on said one side thereof,
   and simultaneously with said application of tension to said shank pushing axially inwardly and radially outwardly on said opposite end of said sleeve so as to bend said opposite end radially outwardly into overlapping engagement with said surface of said workpiece on said opposite side of said workpiece,
       thereby forming a second flange for cooperation with said first-mentioned flange in holding said sleeve to said worpiece.

3. The method of attaching a sleeve and gripping member assembly to a workpiece comprising the steps of
   forming a flange at one end of a sleeve, enlarging the internal diameter of said sleeve at the opposite end thereof,
       thereby providing said sleeve with a thinner wall at said opposite end,
   preparing a member with a head at one end and a shank projecting outwardly from said head,
       said head being formed to a larger lateral dimension than the lateral dimension of the bore through said sleeve at said one end of said sleeve.
   extending said shank through said sleeve so that said shank extends outwardly beyond said opposite end of said sleeve and said head is in adjacency with said one end of said sleeve,
   forming a gripping means on said shank, extending said sleeve through an opening in a workpiece of smaller diameter than the lateral dimension of said flange so that said flange engages the surface of said workpiece adjacent said opening on one side of said workpiece and said opposite end of said sleeve extends axially outwardly beyond the surface of said workpiece adjacent said opening on the opposite side of said workpiece,
   then gripping said gripping means of said shank and applying a tension force thereto,
       thereby to hold said head against said one end of said sleeve and to hold said flange in said engagement with said surface of said workpiece on said one side thereof,
   and simultaneously with said gripping and application of tension force exerting an additional force axially inwardly and radially outwardly on said opposite end of said sleeve,
       thereby to bend said opposite end radially outwardly into overlapping engagement with said opposite side of said workpiece for cooperating with said first-mentioned flange in holding said sleeve to said workpiece.

4. The method as recited in claim 3 in which for said gripping means screw threads are formed on said shank.

5. The method as recited in claim 3 in which for said gripping means at least one arcuate slot is formed in the end of said shank, and said slot is provided with a recessed portion at the inner end thereof.

6. The method as recited in claim 3 in which for said additional force on said opposite end of said sleeve a die is prepared having an annular groove that adjacent the axis thereof is inclined radially outwardly and axially inwardly and remote from the axis thereof is inclined radially and axially outwardly, and is dimensioned to receive said opposite end of said sleeve with said opposite end positioned in said groove adjacent the axis thereof, and said die is moved axially inwardly relative to said sleeve, whereby said die at said groove exerts said axially inward and radially outward force on said opposite end of said sleeve.

7. The method as recited in claim 3 in which for said additional force on said opposite end of said sleeve a die is prepared having an annular recessed portion providing a first surface that adjacent the axis thereof is inclined radially outwardly and axially inwardly, and a second surface remote from the axis thereof that is substantially radial, and is dimensioned to receive said opposite end of said sleeve with said opposite end positioned in said recessed portion adjacent said first surface thereof, whereby said die at said recessed portion exerts said axially inward and radially outward force on said opposite end of said sleeve.

8. The method of providing a sleeve in an opening in a workpiece comprising the steps of
providing an opening in a workpiece,
providing an outwardly extending abutment at one end of a sleeve,
extending said sleeve through said opening in said workpiece so that said abutment overlaps the surface of said workpiece adjacent said opening at one end of said opening and the opposite end of said sleeve projects axially beyond the opposite end of said opening.
associating with said sleeve a gripping member having a head and a shank such that said head is adjacent said one end of said sleeve and said shank thereof projects outwardly beyond said opposite end of said sleeve,
gripping said shank and applying a tension force thereto, thereby holding said head against said sleeve adjacent said one end and holding said abutment against said surface of said workpiece,
simultaneously with the application of said tension force bending said opposite end of said sleeve outwardly to overlap the surface of said workpiece adjacent said opening at said opposite end of said opening so as to provide a second abutment cooperating with said first-mentioned abutment to hold said sleeve to said workpiece with said shank therein, and then removing said gripping member from said sleeve so as to leave said sleeve attached to said workpiece at said opening.

9. The method of providing a sleeve in an opening in a workpiece comprising the steps of
providing an opening in a workpiece,
providing an outwardly extending first abutment at one end of a sleeve,
extending said sleeve through said opening in said workpiece so that said abutment overlaps the surface of said workpiece adjacent said opening at one end of said opening, and the opposite end of said sleeve projects axially beyond the opposite end of said opening,
associating with said sleeve a member having a second outwardly extending abutment and an elongated portion projecting from said second abutment positioned such that said second abutment is in overlapping engagement with said sleeve adjacent said one end of said sleeve and said elongated portion extends through said sleeve,
then pulling on said elongated portion of said member so as to cause said second abutment to exert an axially inward force on said one end of said sleeve that holds said first abutment in engagement with said surface of said workpiece,
and simultaneously with the application of said force bending the opposite end of said sleeve radially outwardly to overlap the surface of said workpiece adjacent said opening at said opposite end of said opening so as to provide a third abutment cooperating with said first abutment to hold said sleeve to said workpiece.

10. The method of providing a sleeve in a workpiece of compressible material comprising the steps of
forming an opening in a workpiece of compressible material,
providing an outwardly extending first abutment at one end of a sleeve,
extending said sleeve through said opening in said workpiece so that said first abutment overlaps the surface of said workpiece adjacent said opening at one end of said opening,
associating with said sleeve a member having a second abutment and an elongated portion projecting from said second abutment, with said member being positioned with said second abutment in overlapping engagement with said sleeve adjacent said one end of said sleeve, and said elongated portion extending through said sleeve,
then pulling on said elongated portion so as to cause said second abutment to exert an axially inward force on said one end of said sleeve and to urge said first abutment against said surface of said workpiece, with said force being applied sufficiently to cause said first abutment to produce a recess in said workpiece receiving said first abutment,
and simultaneously with the application of said force bending said opposite end of said sleeve radially outwardly to overlap the surface of said workpiece adjacent said opening at said opposite end of said opening so as to provide a third abutment cooperating with said first abutment to hold said sleeve to said workpiece.

11. The method as recited in claim 10 including the step of forcing said opposite end of said sleeve axially inwardly as well as radially outwardly to cause said third abutment to compress said surface of said workpiece adjacent said opening of said workpiece at said opposite end of said opening, thereby providing a recess receiving said third abutment.

12. The method as recited in claim 10 in which said elongated member is moved a predetermined limited amount in applying said force to said sleeve for thereby limiting the depth of the recess formed in said workpiece for said first abutment.

13. The method as recited in claim 10 in which
said workpiece is of honeycomb sandwich construction having a core and an outer panel on either end of said core,
said sleeve being extended through said opening so that said first abutment overlaps one of said outer panels,
and in which said force is applied in sufficient magnitude to bend said one outer panel inwardly to form said recess, and to crush said core inwardly of said bend in said one outer panel.

14. The method as recited in claim 13 in which said first abutment is made in the form of a frustoconical flush head, and said flush head is caused to bend said one outer panel to provide said recess with a frustoconical shape.

References Cited
UNITED STATES PATENTS

| | | | |
|---|---|---|---|
| 2,405,898 | 8/1946 | Milone et al. | 29—509 |
| 3,008,552 | 11/1961 | Cushman et al. | 29—455X |
| 3,059,736 | 10/1962 | Boyd | 287—189.36 |
| 3,126,935 | 3/1964 | Tuozzo | 151—69 |

THOMAS H. EAGER, Primary Examiner

U.S. Cl. X.R.

29—452, 512

PO-1050
(5/69)

UNITED STATES PATENT OFFICE
CERTIFICATE OF CORRECTION

Patent No. 3,561,093        Dated Feb. 9, 1971

Inventor(s) Bulent Gulistan

Figure 25:
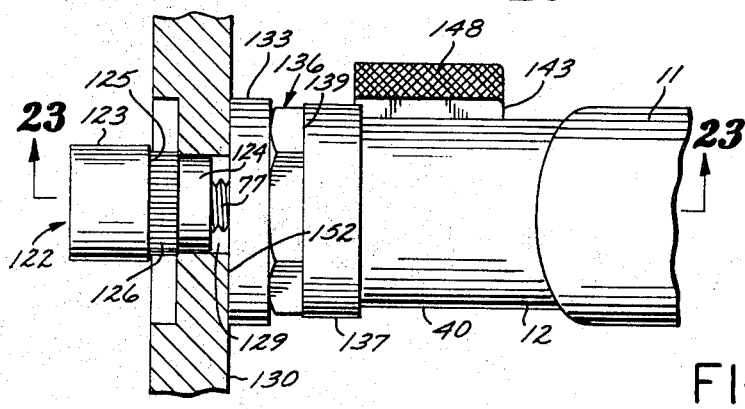
FIG. 25 is a top plan view of the tool and spacer, with the tool engaging a part having a knurled periphery, and the spacer engaging the surface of a workpiece around an opening therein.

It is certified that error appears in the above-identified patent and that said Letters Patent are hereby corrected as shown below:

In the drawings, Sheet 5, Fig. 25, the section line "23-23" should be -- 26-26 --.

Signed and sealed this 6th day of July 1971.

(SEAL)
Attest:

EDWARD M. FLETCHER, JR.
Attesting Officer

WILLIAM E. SCHUYLER, JR.
Commissioner of Patents